United States Patent
Cui et al.

(10) Patent No.: US 11,588,899 B2
(45) Date of Patent: *Feb. 21, 2023

(54) METHOD AND APPARATUS TO FACILITATE A MULTI-POINT CONNECTION WITH A COMMUNICATION DEVICE

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Johns Creek, GA (US)

(73) Assignees: AT&T Intellectual Property I, L.P., Atlanta, GA (US); AT&T Mobility II LLC, Atlanta ( * ) Notice: Subject to any disclaimer, the term of this patent is extended or adjusted under 35 U.S.C. 154(b) by 0 days.

This patent is subject to a terminal disclaimer.

(21) Appl. No.: 17/706,846

(22) Filed: Mar. 29, 2022

(65) Prior Publication Data

US 2022/0224755 A1 Jul. 14, 2022

Related U.S. Application Data

(63) Continuation of application No. 16/702,626, filed on Dec. 4, 2019, now Pat. No. 11,330,064.

(51) Int. Cl.
| | |
|---|---|
| *H04L 67/141* | (2022.01) |
| *H04L 67/146* | (2022.01) |
| *H04L 9/40* | (2022.01) |
| *H04L 67/60* | (2022.01) |

(52) U.S. Cl.
CPC ........... *H04L 67/141* (2013.01); *H04L 63/08* (2013.01); *H04L 67/146* (2013.01); *H04L 67/60* (2022.05)

(58) Field of Classification Search
CPC ..... H04L 67/141; H04L 63/08; H04L 67/146; H04L 67/60
See application file for complete search history.

(56) References Cited

U.S. PATENT DOCUMENTS

| | | | |
|---|---|---|---|
| 10,798,157 B2* | 10/2020 | Bernat | ............... H04L 67/1004 |
| 2009/0061858 A1 | 3/2009 | Rajasimman et al. | |
| 2010/0169496 A1 | 7/2010 | Deshpande et al. | |

(Continued)

*Primary Examiner* — Michael A Keller
*Assistant Examiner* — Thao D Duong
(74) *Attorney, Agent, or Firm* — Guntin & Gust, PLC; Robert Gingher

(57) ABSTRACT

Aspects of the subject disclosure include, for example, selecting a first edge device of a first network to provide a part of a service to a communication device, establishing a first session between the first edge device and a device of a second network for a duration of the service, wherein the first session is associated with a first portion of an address, establishing a second session between the first edge device and the communication device in accordance with an access technology to facilitate a transfer of first data associated with the first part of the service to the communication device, wherein the second session is associated with a second portion of the address, and wherein the second portion of the address identifies the access technology, and transferring the first data to the communication device in accordance with the address, wherein the address comprises a third portion that identifies the communication device. Other embodiments are disclosed.

20 Claims, 8 Drawing Sheets

(56) References Cited

U.S. PATENT DOCUMENTS

| | | |
|---|---|---|
| 2011/0179109 A1 | 7/2011 | Golbourn et al. |
| 2014/0258129 A1 | 9/2014 | Eyes et al. |
| 2015/0058967 A1* | 2/2015 | Ringdahl ............ H04L 63/0254 |
| | | 726/11 |
| 2015/0156697 A1 | 6/2015 | Chen et al. |
| 2017/0054631 A1 | 2/2017 | Horn et al. |
| 2017/0164159 A1 | 6/2017 | Mycek et al. |
| 2018/0206107 A1 | 7/2018 | Koshimizu et al. |
| 2018/0367409 A1 | 12/2018 | Zhang et al. |
| 2019/0045014 A1* | 2/2019 | Shaw .................. H04L 61/4511 |
| 2019/0182895 A1 | 6/2019 | Di Girolamo et al. |
| 2020/0314701 A1* | 10/2020 | Talebi Fard ...... H04W 36/0033 |
| 2021/0014765 A1* | 1/2021 | Shan ..................... H04W 36/14 |
| 2021/0176320 A1 | 6/2021 | Cui et al. |

\* cited by examiner

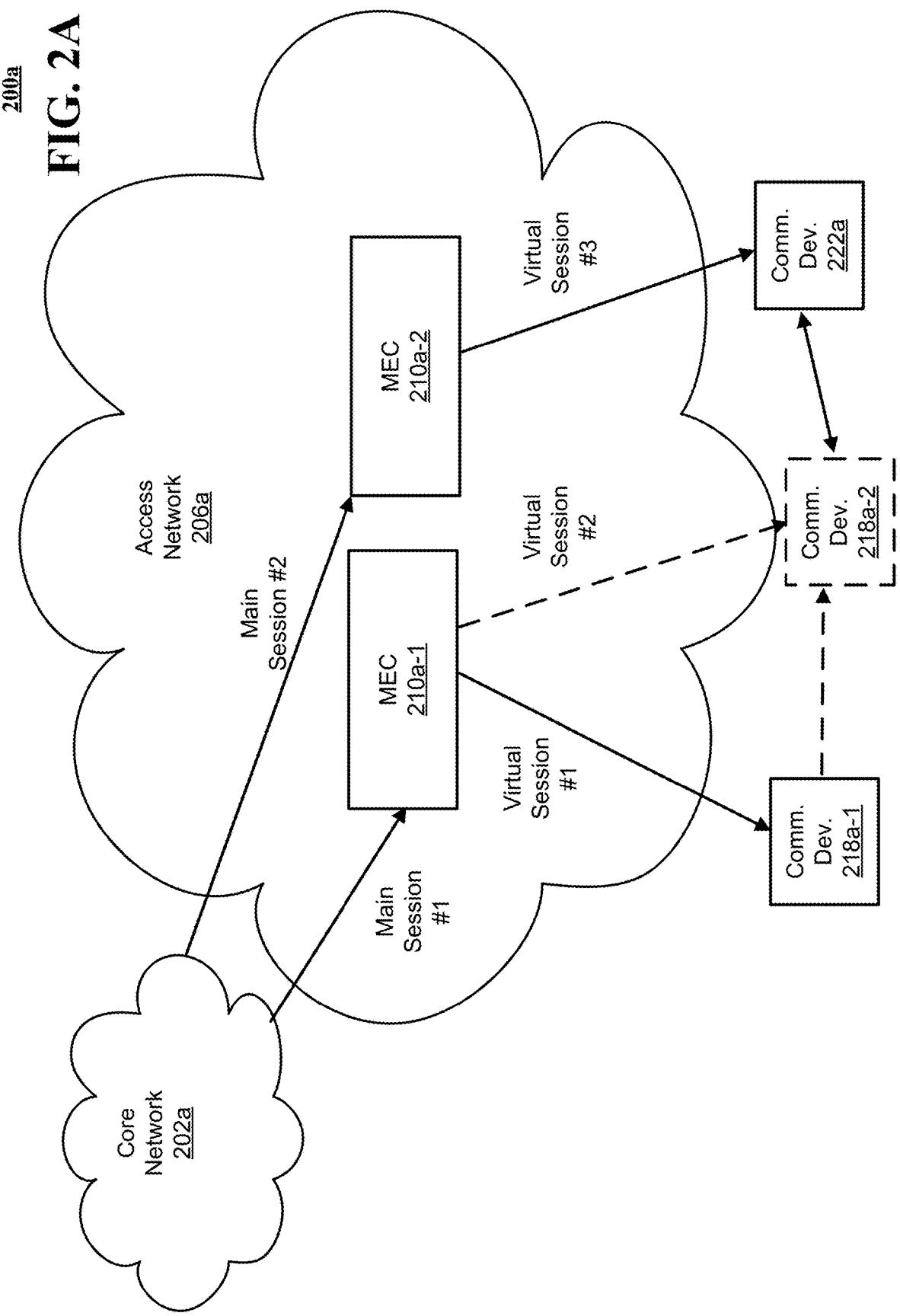

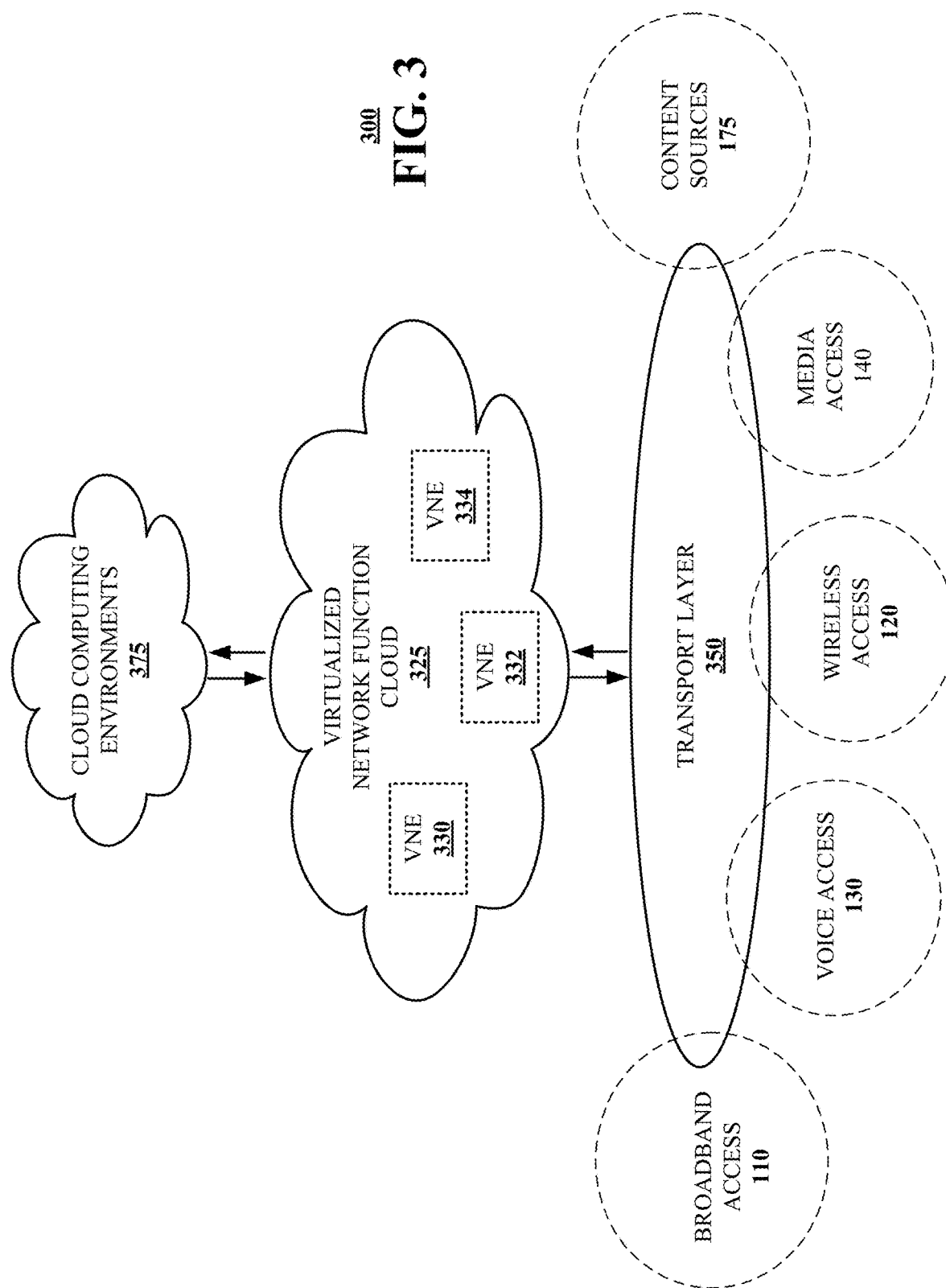

METHOD AND APPARATUS TO FACILITATE A MULTI-POINT CONNECTION WITH A COMMUNICATION DEVICE

CROSS-REFERENCE TO RELATED APPLICATIONS

This is a continuation of application of U.S. application Ser. No. 16/702,626, filed Dec. 4, 2019, which is incorporated herein by reference in its entirety.

FIELD OF THE DISCLOSURE

The subject disclosure relates to a method and apparatus to facilitate a multi-point connection with a communication device.

BACKGROUND

Conventionally, as part of a network topology, a user equipment (UE) accessing services via a network is connected to a given service in a point-to-point manner. For example, the given service may be provisioned to the UE via a core service layer and one or more control/transport layers. However, current trends in network topology/architecture design include relocating functionality or devices/components typically associated with the core to locations in closer proximity to UEs (frequently referred to in the art as a relocation to "the edge" of a network).

Adding further complexity is the fact that many UEs are now capable of (simultaneously) communicating over more than one type of network. For example, a first network may provide a high degree (e.g., a high throughput) of data with a limited (geographic) scope of coverage, whereas a second network may provide a low degree (e.g., a low throughput) of data with a wide (geographic) scope of coverage. In this regard, a UE engaged in a streaming video service session, may connect to the first network in order to obtain sufficient throughput of data (potentially buffering some of the data that is received), while relying on (e.g., engaging in a handover to) the second network in the event that connectivity with the first network is lost. More generally, transitions between networks represent a challenge in terms of both a management and control of resources from the perspective of a network operator/service provider, as well as providing a sufficient quality of experience (QoE) from the perspective of a user operating the UE.

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
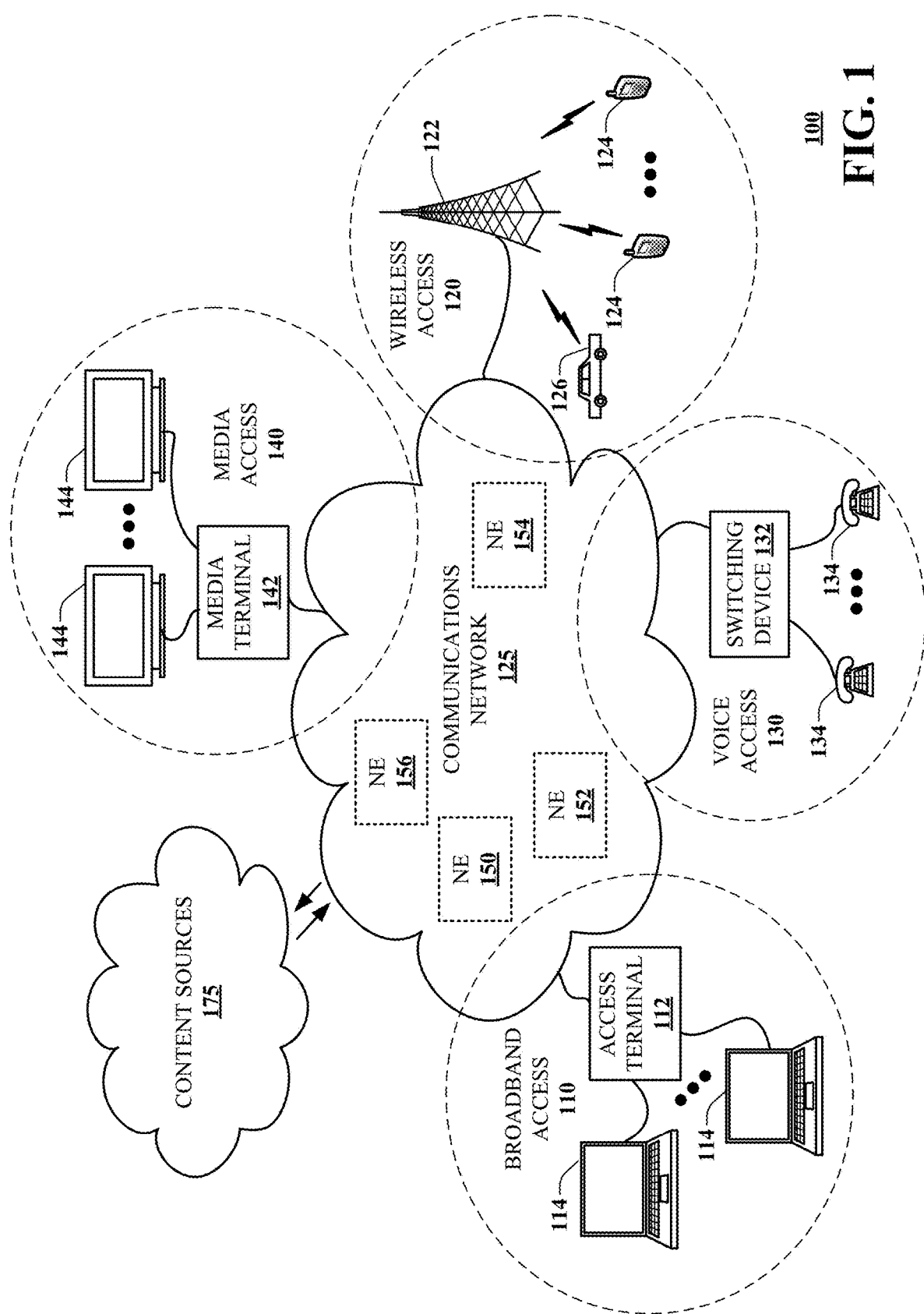
FIG. 1 is a block diagram illustrating an exemplary, non-limiting embodiment of a communications network in accordance with various aspects described herein.

The subject disclosure describes, among other things, illustrative embodiments for facilitating a provisioning of one or more services via one or more sessions, where the session(s) are associated with one or more addresses. Other embodiments are described in the subject disclosure.

One or more aspects of the subject disclosure include obtaining a request associated with a service from a user equipment, wherein the request comprises at least one credential associated with the user equipment, a user of the user equipment, or a combination thereof, responsive to the obtaining of the request, verifying that the request is valid by comparing the at least one credential with a plurality of verified credentials, establishing a main session between a core network and an access network responsive to the verifying, selecting a first edge device of the access network responsive to the establishing of the main session, establishing at least one virtual session between the first edge device and the user equipment in accordance with at least a first access technology, and conveying first data associated with at least a part of the service to the user equipment in accordance with an address, wherein the address comprises a first identifier that identifies the main session, a second identifier that identifies the user equipment, and at least a third identifier that identifies the at least one virtual session.

One or more aspects of the subject disclosure include selecting a first edge device of a first network to provide a first part of a first service to a user equipment, establishing a first session between the first edge device and a device of a second network for a duration of the first service, wherein the first session is associated with a first portion of a first address, establishing a second session between the first edge device and the user equipment in accordance with a first access technology to facilitate a transfer of first data associated with the first part of the first service to the user equipment, wherein the second session is associated with a second portion of the first address, and wherein the second portion of the first address identifies the first access technology, and transferring the first data to the user equipment in accordance with the first address, wherein the first address comprises a third portion that identifies the user equipment.

One or more aspects of the subject disclosure include identifying an application executed by a communication device in accordance with a service, identifying a first edge device of an access network capable of providing a first portion of the service in accordance with a first access technology and a second edge device of the access network capable of providing the first portion of the service in accordance with a second access technology that is different from the first access technology, selecting one of the first edge device or the second edge device as a first selected edge device, wherein the selecting of the first selected edge device is based on the identifying of the application, and transferring first data associated with the first portion of the service from the first selected edge device to the communication device in accordance with a first address, wherein the first address comprises a first address portion that identifies a first main session between a core network and an access network, a second address portion that identifies the communication device, and a third address portion that identifies a first selected access technology of the first selected edge device.

Referring now to FIG. 1, a block diagram is shown illustrating an example, non-limiting embodiment of a communications network 100 in accordance with various aspects described herein. For example, communications network 100 can facilitate in whole or in part obtaining a request associated with a service from a user equipment, wherein the request comprises at least one credential associated with the user equipment, a user of the user equipment, or a combination thereof, responsive to the obtaining of the request, verifying that the request is valid by comparing the at least one credential with a plurality of verified credentials, establishing a main session between a core network and an access network responsive to the verifying, selecting a first edge device of the access network responsive to the establishing of the main session, establishing at least one virtual session between the first edge device and the user equipment in accordance with at least a first access technology, and conveying first data associated with at least a part of the service to the user equipment in accordance with an address, wherein the address comprises a first identifier that identifies the main session, a second identifier that identifies the user equipment, and at least a third identifier that identifies the at least one virtual session. Communications network 100 can facilitate in whole or in part selecting a first edge device of a first network to provide a first part of a first service to a user equipment, establishing a first session between the first edge device and a device of a second network for a duration of the first service, wherein the first session is associated with a first portion of a first address, establishing a second session between the first edge device and the user equipment in accordance with a first access technology to facilitate a transfer of first data associated with the first part of the first service to the user equipment, wherein the second session is associated with a second portion of the first address, and wherein the second portion of the first address identifies the first access technology, and transferring the first data to the user equipment in accordance with the first address, wherein the first address comprises a third portion that identifies the user equipment. Communications network 100 can facilitate in whole or in part identifying an application executed by a communication device in accordance with a service, identifying a first edge device of an access network capable of providing a first portion of the service in accordance with a first access technology and a second edge device of the access network capable of providing the first portion of the service in accordance with a second access technology that is different from the first access technology, selecting one of the first edge device or the second edge device as a first selected edge device, wherein the selecting of the first selected edge device is based on the identifying of the application, and transferring first data associated with the first portion of the service from the first selected edge device to the communication device in accordance with a first address, wherein the first address comprises a first address portion that identifies a first main session between a core network and an access network, a second address portion that identifies the communication device, and a third address portion that identifies a first selected access technology of the first selected edge device.

As shown in FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200a functioning within, or operatively overlaid upon, the communication network 100 of FIG. 1 in accordance with various aspects described herein. For reasons that will become clearer below, the system 200a may be referred to as a hierarchical, distributed system, whereby devices/components and functionality may be located proximate to communication devices (e.g., user equipment [UE]) that access services via the system 200a.

The system 200a may include one or more core networks (e.g., core network 202a) and one or more access networks (e.g., access network 206a). The core network 202a and the access network 206a may be communicatively coupled to one another via one or more sessions as described further below. As part of providing services (e.g., communication services) in the system 200a, the core network 202a may manage high-level tasks, such as managing a user's/subscriber's account with a given service. For example, the core network 202a may be responsible for processing user/subscriber payments as part of a service/license agreement between the user/subscriber and the service. The core network 202a may also be responsible for maintaining security in the system 200a.

The access network 206a may host one or more mobile edge computing (MEC) devices, such as for example a first MEC 210a-1 and a second MEC 210a-2. The first MEC 210a-1 and the second MEC 210a-2 may be communicatively coupled to one another for purposes of managing one or more communication sessions associated with one or more communication devices.

As described above, the system 200a may be used to provide services to communication devices. To demonstrate, FIG. 2A illustrates a first communication device corresponding to a mobile communication device that relocates from a first position/location (represented via reference character 218a-1) to a second position/location (represented via reference character 218a-2). A second communication device (which may be mobile or stationary) is represented via reference character 222a.

When in the first position 218a-1, the first communication device may initiate/request access to a first service. The first MEC 210a-1 may receive that request. In response to receiving the request, the access network 206a (e.g., the first MEC 210a-1) may forward the request to the core network 202a. The core network 202a may verify/authorize the request (potentially on the basis of confirming that credentials associated with the first communication device are verified, ensuring that a user/subscriber account is in good standing, etc.). Responsive to verifying/authorizing the request, the core network 202a (or a device associated therewith) and the access network 206a (e.g., the first MEC 210a-1) may establish a first main session with respect to one another. The first main session may persist for a duration of the first service.

Based on establishing the first main session with the core network 202a, the first MEC 210a-1 may establish a first virtual session with the first communication device. The first virtual session may invoke/utilize a first access technology. For example, the first virtual session may utilize resources (e.g., processors, antennas, algorithms, etc.) at the first MEC 210a-1 and/or the first communication device that are operative in accordance with the first access technology.

Thereafter, and as described above, the first communication device may relocate from the first position 218a-1 to the second position 218a-2 while communication associated with the first main session and the first virtual session is ongoing. The relocation of the first communication device to the second position 218a-2 may place the first communication device right on the edge of the range of coverage associated with the first access technology, such that the quality of service (QoS), or, analogously, the quality of experience (QoE), from the perspective of the first communication device (or, analogously, a user of the first communication device) may degrade if the communication simply continued via the first virtual session. To remedy this situation, the first MEC 210a-1 may establish a second virtual session with the first communication device when the first communication device is at the second position 218a-2.

The second virtual session (between the first MEC 210a-1 and the first communication device) may invoke/utilize a second access technology that may be the same as, or different from, the first access technology associated with the first virtual session. The second virtual session may utilize resources at the first MEC 210a-1 and/or the first communication device that are operative in accordance with the second access technology. Thus, when the first communication device is located at the second position 218a-2, the first communication device may be simultaneously/concurrently engaged in multiple virtual sessions (namely, the first virtual session and the second virtual session) with the first MEC 210a-1. The use of multiple, concurrent virtual sessions may be used to ensure a sufficient QoS/QoE, albeit at the expense of utilizing additional resources to support the additional virtual session.

In a manner similar to that described above, the second communication device 222a may initiate/request access to a second service (which may be the same as, or different from, the first service requested by the first communication device). The second MEC 210a-2 may receive the request for the second service. In response to receiving the request for the second service, the access network 206a (e.g., the second MEC 210a-2) may forward the request for the second service to the core network 202a. The core network 202a may verify/authorize the request for the second service (potentially on the basis of confirming that credentials associated with the second communication device are verified, ensuring that a user/subscriber account is in good standing, etc.). Responsive to verifying/authorizing the request for the second service, the core network 202a (or a device associated therewith) and the access network 206a (e.g., the second MEC 210a-2) may establish a second main session with respect to one another. The second main session may persist for a duration of the second service.

Based on establishing the second main session with the core network 202a, the second MEC 210a-2 may establish a virtual session (e.g., a third virtual session) with the second communication device. The third virtual session may invoke/utilize an access technology (e.g., a third access technology). For example, the third virtual session may utilize resources (e.g., processors, antennas, algorithms, etc.) at the second MEC 210a-2 and/or the second communication device that are operative in accordance with the third access technology.

Thus, as described above, the access network 206a (e.g., the first MEC 210a-1 and/or the second MEC 210a-2) may establish one or more virtual sessions with a given communication device to facilitate a transfer of data or information in relation to a service. The use of virtual sessions may at least partially hide/obscure details regarding how a service is administered in the access network 206a from the core network 202a, thereby alleviating the core network 202a of having to be burdened by such details and reducing traffic/load in the system 200a (e.g., as between the core network 202a and the access network 206a). Thus, the use of one or more virtual sessions between the access network 206a and a given communication device may tend to simplify the design and management of the core network 202a.

Similarly, details regarding how the service is administered by the access network 206a may be at least partially hidden/obscured from a given communication device. For example, an application (e.g., a streaming video player) executed by a communication device may be indifferent as to the access technology utilized to obtain (e.g., receive) and/or provide (e.g., transmit) data or information associated with the service. Hiding/obscuring such details from the communication device may simplify the design and management of the communication device.

The use of virtual sessions allows for intelligent decisions to be made by the access network 206a (e.g., the first MEC 210a-1 and/or the second MEC 210a-2) with low latency due to the proximity of the MECs to communication devices. For example, the proximity of the MECs and the communication devices reduces the time data or information is spent traversing a communication path or channel.

As described above, aspects of the disclosure may reduce traffic/load in the system 200a by facilitating an intelligent use of resources. For example, if a communication device lacks a particular capability (e.g., lacks a display capability at a given quality), data associated with that particular capability might not be transmitted (e.g., streamed) to the communication device. In this regard, a resource (e.g., a communication bandwidth) might not be utilized/exhausted unnecessarily.

While some of the examples described above related to a generation/establishment of one or more virtual sessions due to mobility of a communication device, aspects of the disclosure may facilitate a generation/establishment of one or more virtual sessions with a communication device even when the communication device is stationary. To demonstrate, various factors/parameters, such as for example changing environmental conditions (e.g., obstructions entering into a line-of-sight between a MEC and the communication device), dynamic loading conditions, changes in applications that are executed, etc., may have an impact on a QoS/QoE experienced by the communication device (or, analogously, the MEC) and/or may place additional demands (or, analogously, relax demands) on the communication device and/or the MEC. In this respect, such factors/parameters (in addition to mobility considerations) may serve as inputs to decision-making logic/algorithms to determine whether to establish/generate a given session (e.g., a given virtual session) and/or whether to terminate/end a given session (e.g., a given virtual session).

A porting/transfer and/or an establishment/generation of a session (e.g., a main session and/or a virtual session) may adhere to principles of Internet Protocol (IP) persistency, which is to say that an address (e.g., an IP address) assigned to a communication device may be maintained during a provisioning of services with respect to, e.g., the core network 202a. Such IP persistency may be prevalent in relation to, e.g., maintaining security in the system 200a.

In this regard, an addressing scheme that may be used to convey/transfer data or information in the system 200a may adhere to an address triple of the form: main session ID, UE ID, RAT ID, where:

main session ID may correspond to an identifier of a main session (e.g., between the core network 202a and the access network 206a), and may take the form of an IP address, UE ID may correspond to a unique identifier of a UE (or, analogously, a communication device), and may incorporate elements of a make, model and/or serial number of the UE, a MAC address, etc., and The RAT ID may correspond to an identifier for a given access technology and may serve to identify a given virtual session between the access network 206a (e.g., a MEC) and the UE.

In some embodiments, the access network 206a (e.g., a MEC) may be responsible for delegating or assigning a portion of an address, such as for example a UE ID and/or a RAT ID. The delegation/assignment of the portion of the address may be used to uniquely distinguish devices and sessions (e.g., virtual sessions) in the system 200a.

One skilled in the art will appreciate, based on the foregoing description, that the establishment and control/regulation/management of a session associated with a communication device (e.g., a UE) and a service may adhere to a hierarchical architecture, whereby functionality may be distributed to various devices/entities of a communication system at various levels of abstraction/management. Still further, aspects of this disclosure support user/device mobility by enabling a session to be seamlessly ported/transferred, established, and/or terminated, potentially across multiple radio access networks (RANs) and/or radio access technologies (RATs). For example, aspects of the disclosure may be implemented in connection with one or more types of RANs/RATs, such as for example LTE, 4G, 5G, 6G, Wi-Fi, LteM, satellite, etc.

As described above, a conveyance or transfer of data or information associated with a service may be controlled/regulated/managed via an addressing scheme that uniquely identifies a communication device and one or more sessions (e.g., a main session and/or a virtual session). The data or information may be conveyed/transferred in accordance with one or both of a control plane and a user/data plane of a given network or access technology. For example, and briefly referring to FIG. 2B, a communication device 218b (which may correspond to the first communication device 218a-1/218a-2 or the second communication device 222a of FIG. 2A) is shown as managing connections (via, e.g., an operating system [OS] 232b) via three access technologies (236b-1, 236b-2, 236b-3) over respective user/data planes (denoted via solid lines in FIG. 2B) and control planes (denoted via dashed lines in FIG. 2B). While the control and user/data planes are shown in FIG. 2B as supporting bi-directional transfers, in some embodiments a given plane may support (only) a unidirectional transfer.

In some embodiments communication devices may communicate with one another as part of a subnetwork (e.g., a peer-to-peer network). For example, and referring to FIG. 2A, when the first communication device is located at the second positon 218a-2, the first communication device may establish a localized communication channel or session with the second communication device 222a (as represented via the arrow between the first communication device at the second positon 218a-2 and the second communication device 222a in FIG. 2A). That localized communication might not implicate/involve the access network 206a (e.g., the first MEC 210a-1 or the second MEC 210a-2) in some embodiments.

Figure 2B:
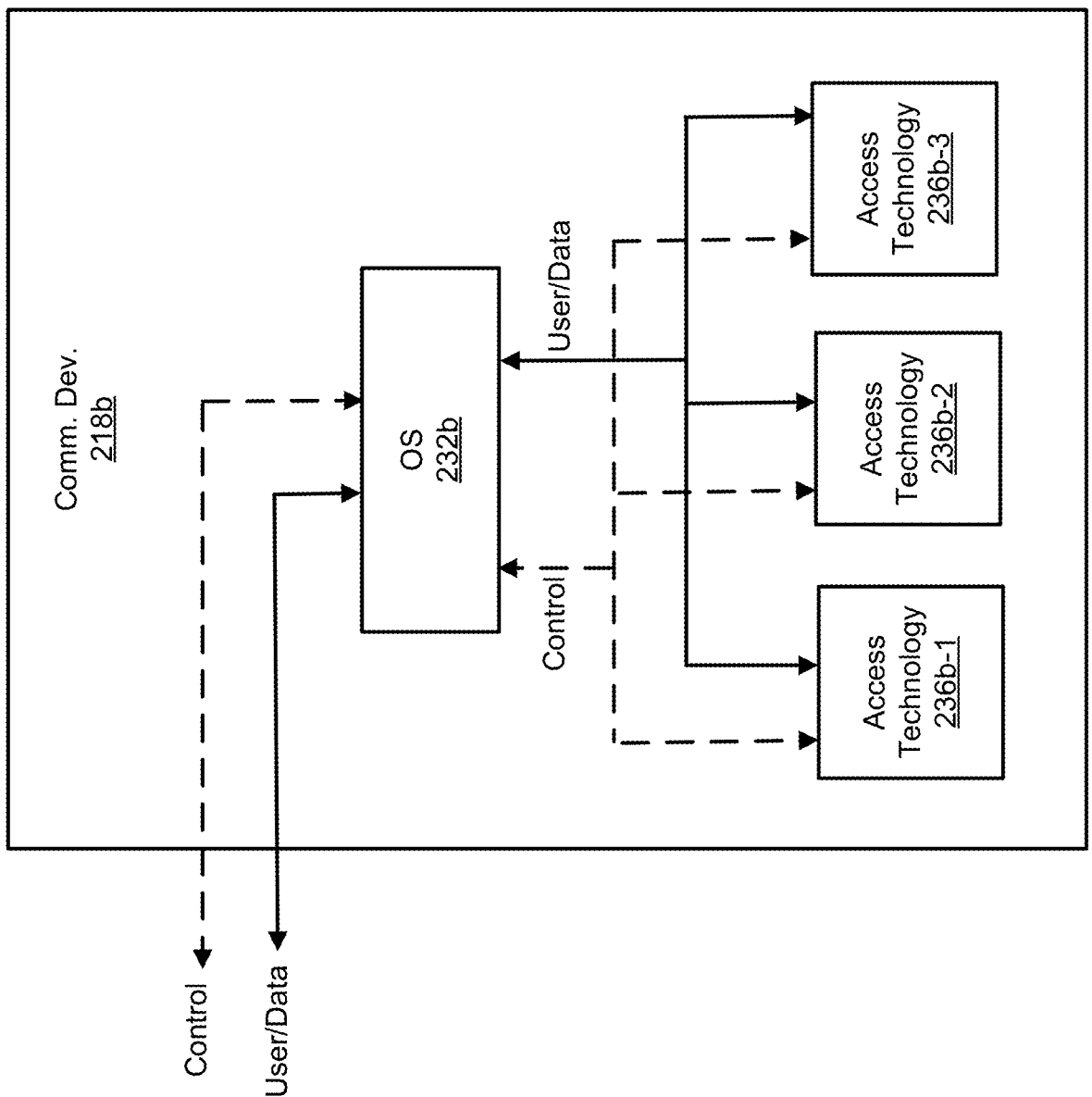
FIG. 2B is a block diagram illustrating an example, non-limiting embodiment of a communication device that is capable of connecting to a service via multiple radio access technologies in accordance with various aspects described herein.

FIG. 2B depicts an illustrative embodiment of a method 200c in accordance with various aspects described herein. Aspects of the method 200c may be implemented/executed/practiced in accordance with one or more of the systems, devices, and/or components described herein. The method 200c may be executed to provide aspects of a service to a communication device (e.g., a user equipment).

In block 202c, a request for service may be obtained (e.g., received) from a communication device. For example, as part of block 202c the communication device may enroll with a network operator or service provider. Such enrollment may incorporate terms/conditions of a service license agreement (SLA). In some embodiments, the request of block 202c may include an identification/indication of media requested by the communication device. In some embodiments, the request of block 202c may include one or more credentials (e.g., a username and password, a personal identification number (PIN), a biometric credential (e.g., results of a fingerprint or retinal scan), etc.) that may be verified as set forth below. The request of block 202c may include an identification of the service.

In block 206c, the request (of block 202c) may be verified. For example, any credentials that are included with the request may be compared with a plurality (e.g., a database) of verified credentials to ensure that the request is originating from an authorized user or device. The verification of block 206c may include confirmation that a subscription fee or license is paid for. For example, the verification of block 206c may ensure that the communication device (or, analogously, a user of the communication device) is authorized to use/consume the requested service.

Assuming that the verification of block 206c is answered in the affirmative (e.g., the "yes" path is taken out of block 206c), flow may proceed from block 206c to block 210c. Otherwise (e.g., the "no" path is taken out of block 206c), flow may proceed from block 206c to block 214c.

In block 214c, a signal/message/alert may be provided to the communication device that the service request (of block 202c) was denied. The message may be presented by the communication device. The method 200c may end as part of block 214c.

In block 210c, a signal/message/alert may be provided to the communication device that the service request (of block 202c) was accepted. The message may be presented by the communication device.

As part of block 210c, a main session may be established. The establishment of the main session in block 210c may serve to form a part/portion of an addressing scheme that may be used to convey/transfer data or information associated with a service. For example, the establishment of the main session in block 210c may coincide with/include an assignment of a main session ID (e.g., an IP address) to the main session.

In block 218c, one or more parameters may be identified. For example, parameters of an SLA (e.g., a contracted for quality of service (QoS) or quality of experience (QoE) parameter), parameters of the communication device (e.g., a display capability, an audio capability, a processing speed, a memory or buffer constraint/capacity, an identification of a supported network or access technology, a location of the communication device [on an absolute basis or a relative basis], a power or battery level, etc.), parameters of edge devices (e.g., loads [historical, current/actual, and/or scheduled/predicted loads], identification of supported network or access technologies, range of coverage, throughput available, bandwidth available, frequencies/frequency bands available, etc.), etc., may be identified as part of block 218c. In some embodiments, the parameters of block 218c may include a received signal strength indicator (RSSI), an interference level, a noise level, a load, a power level, or any combination thereof.

In block 222c, a first edge device may be selected to initiate/establish at least one session (e.g., at least one virtual session) with the communication device. The at least one session may be established in accordance with one or more of the parameters identified in block 218c. The at least one session may facilitate a provisioning of at least a part of the service (requested in block 202b) to the communication device.

The establishment of the at least one session in block 222c may serve to form a part/portion of the addressing scheme that may be used to convey/transfer data or information associated with a service. For example, the establishment of a virtual session in block 222c may coincide with/include an assignment of a virtual session ID (e.g., a RAT ID) corresponding to the virtual session.

In block 226c, information or data associated with at least a part of a service may be transferred/conveyed between the communication device and one or more other devices. The information/data may be transferred in accordance with an addressing scheme as part of block 226c. For example, the information/data may be transferred/conveyed via an address triple incorporating aspects of the main session ID (of block 210c) and the virtual session ID (of block 222c) described above.

Figure 2C:
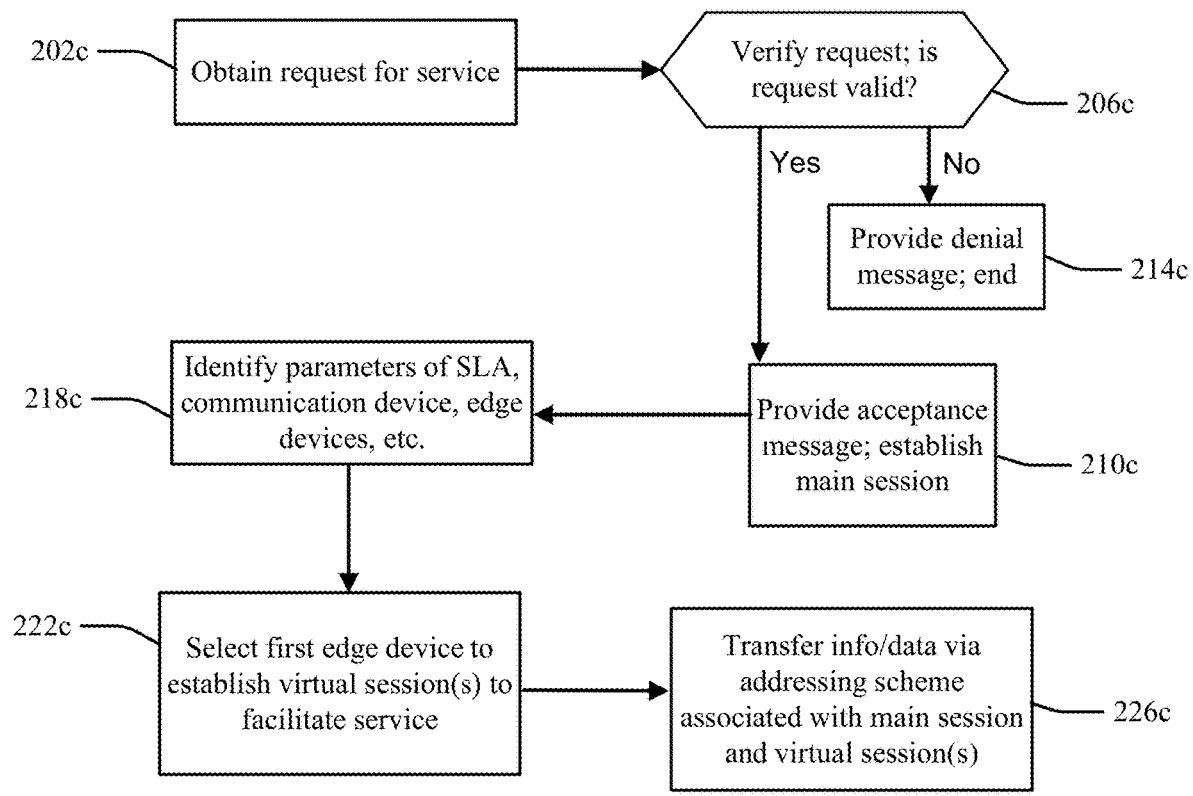
FIG. 2C depicts an illustrative embodiment of a method in accordance with various aspects described herein.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, aspects of the disclosure may facilitate multi-point connectivity via the generation and use of multiple virtual sessions and/or RATs, while at the same time promoting aspects of security and efficiency via the use of a single main session. In some embodiments, such as for example in relation to Internet of Things (IoT) devices, the devices may establish subnetworks to facilitate localized communications and data processing (potentially in accordance with one or more algorithms). The use of such (IoT) devices may facilitate an execution of one or more applications, such as for example heating/cooling/ventilation applications, waste management applications, autonomous vehicle control applications, medical device applications, consumer purchasing applications, advertisement selection/population/rendering applications, media recommendation applications, etc.

Aspects of the disclosure may be applied in connection with one or more services. To demonstrate, aspects of the disclosure may be applied in relation to a streaming video service, a voice service, a text message service, a videoconference service, or any combination thereof.

Aspects of the disclosure may facilitate transferring data or information with respect to a given device via one or more RATs. To demonstrate, in the context of a connected vehicle the vehicle may include multiple addressable units (MAUs) behind an entry point onboarding unit (OBU). Each of the MAUs may communicate with the OBU via one or more virtual sessions, while the OBU may communicate with, e.g., a server via a main session. From the perspective of the server, it may appear to the server as if the server is communicating with a single entity (e.g., the OBU) while in actuality the server may be communicating with hundreds or even thousands of different entities (e.g., MAUs). Such communications may occur without any conflicts in terms of an addressing scheme that is utilized. As described herein, an addressing scheme may incorporate a triple of a main session ID, a device ID, and a virtual session ID to uniquely distinguish a communication path/channel between a core network and a device.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200a, communication device 200b, and method 200c presented in FIGS. 1, 2A, 2B, and 2C. For example, virtualized communication network 300 can facilitate in whole or in part obtaining a request associated with a service from a user equipment, wherein the request comprises at least one credential associated with the user equipment, a user of the user equipment, or a combination thereof, responsive to the obtaining of the request, verifying that the request is valid by comparing the at least one credential with a plurality of verified credentials, establishing a main session between a core network and an access network responsive to the verifying, selecting a first edge device of the access network responsive to the establishing of the main session, establishing at least one virtual session between the first edge device and the user equipment in accordance with at least a first access technology, and conveying first data associated with at least a part of the service to the user equipment in accordance with an address, wherein the address comprises a first identifier that identifies the main session, a second identifier that identifies the user equipment, and at least a third identifier that identifies the at least one virtual session. Virtualized communication network 300 can facilitate in whole or in part selecting a first edge device of a first network to provide a first part of a first service to a user equipment, establishing a first session between the first edge device and a device of a second network for a duration of the first service, wherein the first session is associated with a first portion of a first address, establishing a second session between the first edge device and the user equipment in accordance with a first access technology to facilitate a transfer of first data associated with the first part of the first service to the user equipment, wherein the second session is associated with a second portion of the first address, and wherein the second portion of the first address identifies the first access technology, and transferring the first data to the user equipment in accordance with the first address, wherein the first address comprises a third portion that identifies the user equipment. Virtualized communication network 300 can facilitate in whole or in part identifying an application executed by a communication device in accordance with a service, identifying a first edge device of an access network capable of providing a first portion of the service in accordance with a first access technology and a second edge device of the access network capable of providing the first portion of the service in accordance with a second access technology that is different from the first access technology, selecting one of the first edge device or the second edge device as a first selected edge device, wherein the selecting of the first selected edge device is based on the identifying of the application, and transferring first data associated with the first portion of the service from the first selected edge device to the communication device in accordance with a first address, wherein the first address comprises a first address portion that identifies a first main session between a core network and an access network, a second address portion that identifies the communication device, and a third address portion that identifies a first selected access technology of the first selected edge device.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
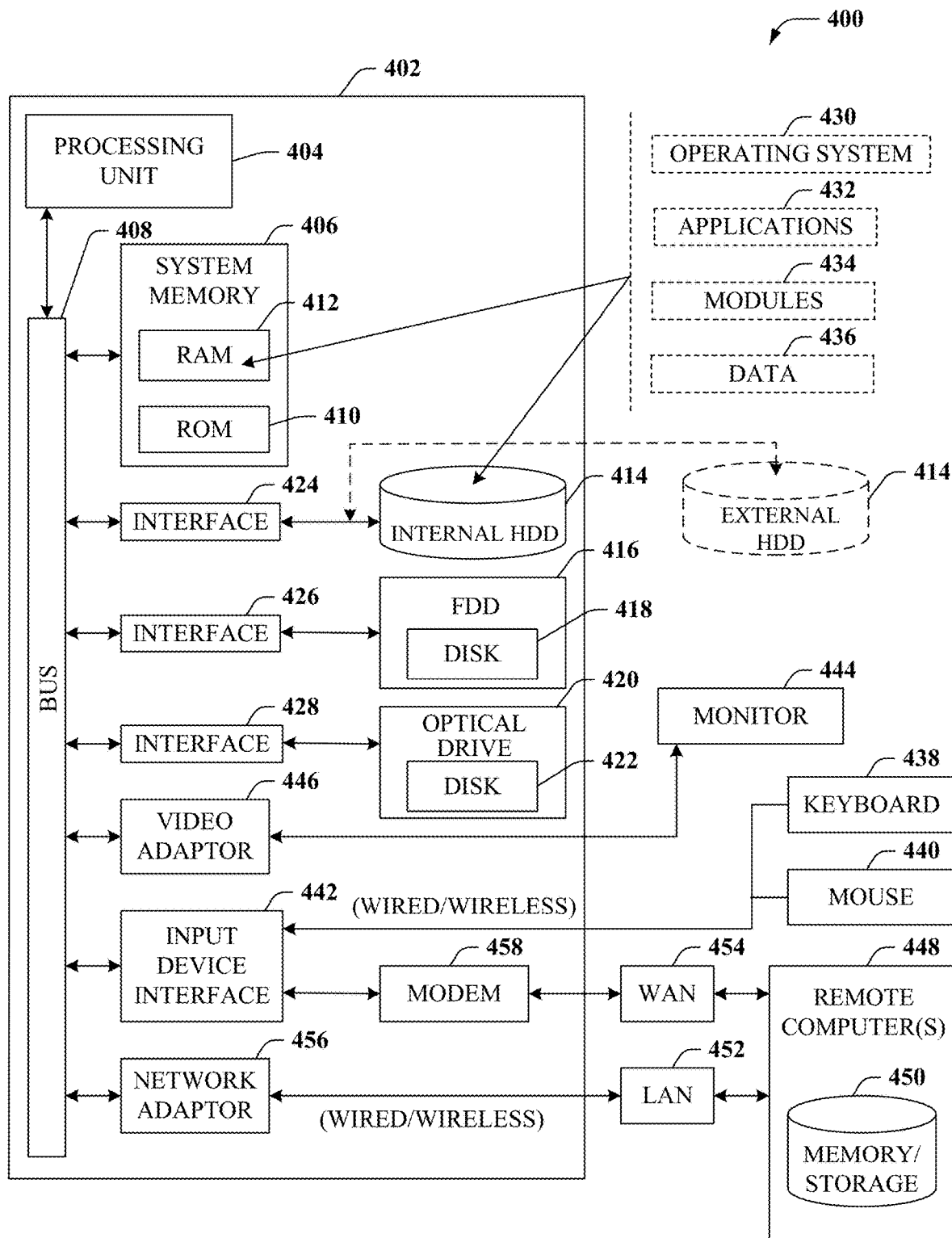
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a request associated with a service from a user equipment, wherein the request comprises at least one credential associated with the user equipment, a user of the user equipment, or a combination thereof, responsive to the obtaining of the request, verifying that the request is valid by comparing the at least one credential with a plurality of verified credentials, establishing a main session between a core network and an access network responsive to the verifying, selecting a first edge device of the access network responsive to the establishing of the main session, establishing at least one virtual session between the first edge device and the user equipment in accordance with at least a first access technology, and conveying first data associated with at least a part of the service to the user equipment in accordance with an address, wherein the address comprises a first identifier that identifies the main session, a second identifier that identifies the user equipment, and at least a third identifier that identifies the at least one virtual session. Computing environment 400 can facilitate in whole or in part selecting a first edge device of a first network to provide a first part of a first service to a user equipment, establishing a first session between the first edge device and a device of a second network for a duration of the first service, wherein the first session is associated with a first portion of a first address, establishing a second session between the first edge device and the user equipment in accordance with a first access technology to facilitate a transfer of first data associated with the first part of the first service to the user equipment, wherein the second session is associated with a second portion of the first address, and wherein the second portion of the first address identifies the first access technology, and transferring the first data to the user equipment in accordance with the first address, wherein the first address comprises a third portion that identifies the user equipment. Computing environment 400 can facilitate in whole or in part identifying an application executed by a communication device in accordance with a service, identifying a first edge device of an access network capable of providing a first portion of the service in accordance with a first access technology and a second edge device of the access network capable of providing the first portion of the service in accordance with a second access technology that is different from the first access technology, selecting one of the first edge device or the second edge device as a first selected edge device, wherein the selecting of the first selected edge device is based on the identifying of the application, and transferring first data associated with the first portion of the service from the first selected edge device to the communication device in accordance with a first address, wherein the first address comprises a first address portion that identifies a first main session between a core network and an access network, a second address portion that identifies the communication device, and a third address portion that identifies a first selected access technology of the first selected edge device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
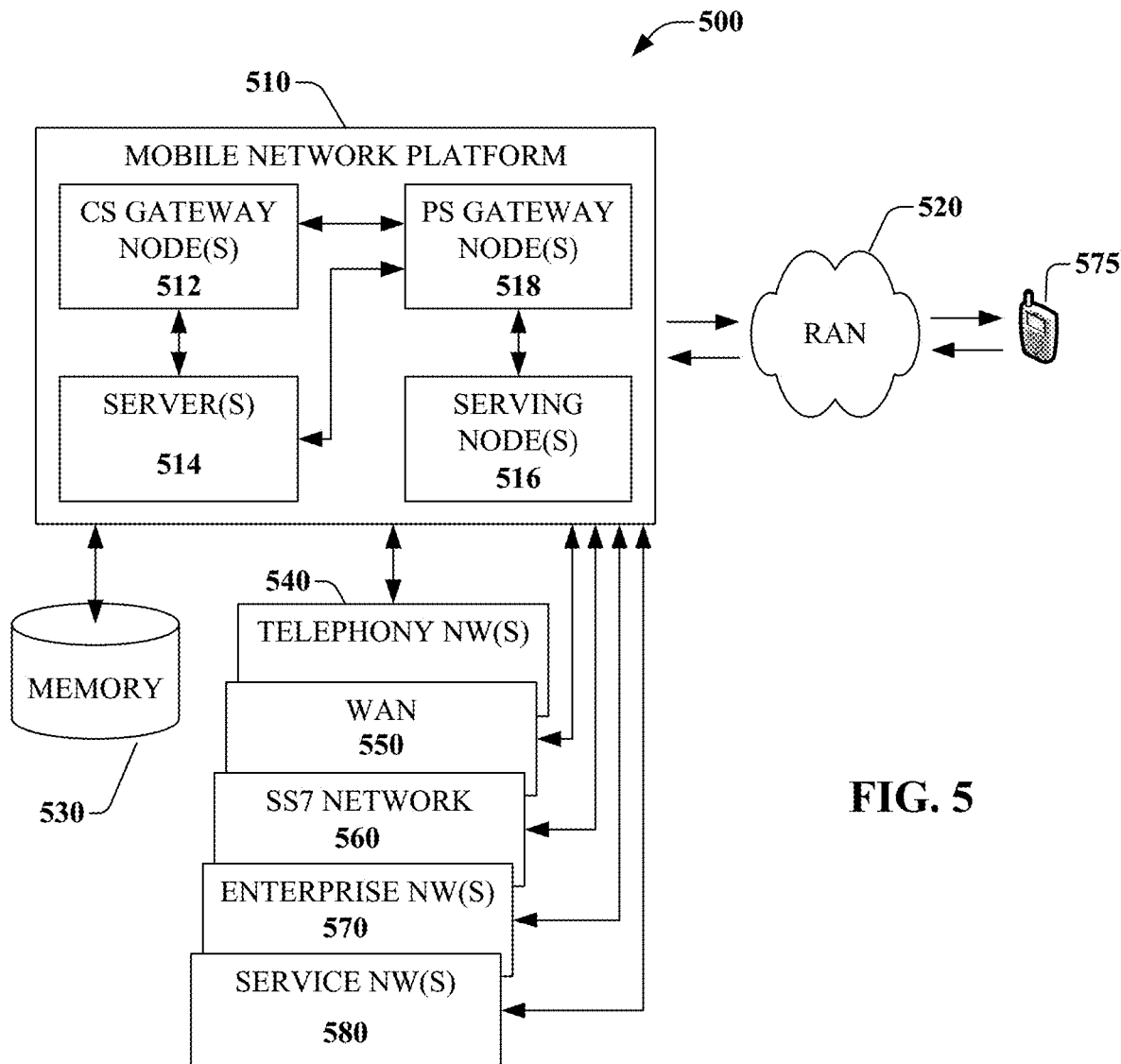
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a request associated with a service from a user equipment, wherein the request comprises at least one credential associated with the user equipment, a user of the user equipment, or a combination thereof, responsive to the obtaining of the request, verifying that the request is valid by comparing the at least one credential with a plurality of verified credentials, establishing a main session between a core network and an access network responsive to the verifying, selecting a first edge device of the access network responsive to the establishing of the main session, establishing at least one virtual session between the first edge device and the user equipment in accordance with at least a first access technology, and conveying first data associated with at least a part of the service to the user equipment in accordance with an address, wherein the address comprises a first identifier that identifies the main session, a second identifier that identifies the user equipment, and at least a third identifier that identifies the at least one virtual session. Platform 510 can facilitate in whole or in part selecting a first edge device of a first network to provide a first part of a first service to a user equipment, establishing a first session between the first edge device and a device of a second network for a duration of the first service, wherein the first session is associated with a first portion of a first address, establishing a second session between the first edge device and the user equipment in accordance with a first access technology to facilitate a transfer of first data associated with the first part of the first service to the user equipment, wherein the second session is associated with a second portion of the first address, and wherein the second portion of the first address identifies the first access technology, and transferring the first data to the user equipment in accordance with the first address, wherein the first address comprises a third portion that identifies the user equipment. Platform 510 can facilitate in whole or in part identifying an application executed by a communication device in accordance with a service, identifying a first edge device of an access network capable of providing a first portion of the service in accordance with a first access technology and a second edge device of the access network capable of providing the first portion of the service in accordance with a second access technology that is different from the first access technology, selecting one of the first edge device or the second edge device as a first selected edge device, wherein the selecting of the first selected edge device is based on the identifying of the application, and transferring first data associated with the first portion of the service from the first selected edge device to the communication device in accordance with a first address, wherein the first address comprises a first address portion that identifies a first main session between a core network and an access network, a second address portion that identifies the communication device, and a third address portion that identifies a first selected access technology of the first selected edge device.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
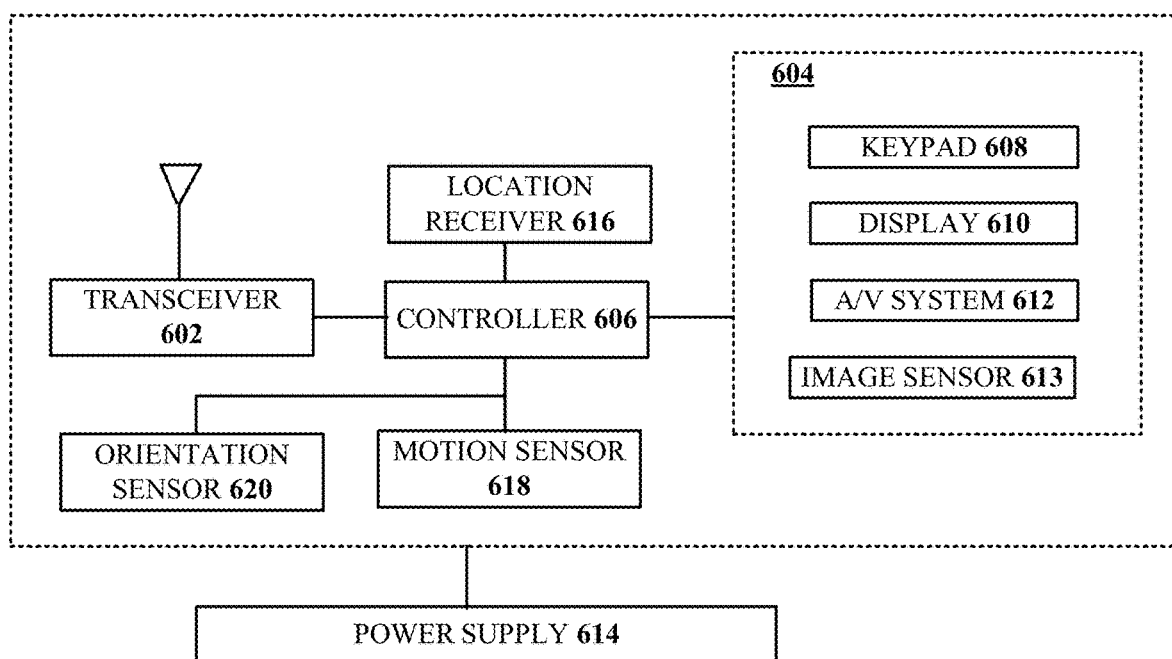
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a request associated with a service from a user equipment, wherein the request comprises at least one credential associated with the user equipment, a user of the user equipment, or a combination thereof, responsive to the obtaining of the request, verifying that the request is valid by comparing the at least one credential with a plurality of verified credentials, establishing a main session between a core network and an access network responsive to the verifying, selecting a first edge device of the access network responsive to the establishing of the main session, establishing at least one virtual session between the first edge device and the user equipment in accordance with at least a first access technology, and conveying first data associated with at least a part of the service to the user equipment in accordance with an address, wherein the address comprises a first identifier that identifies the main session, a second identifier that identifies the user equipment, and at least a third identifier that identifies the at least one virtual session. Computing device 600 can facilitate in whole or in part selecting a first edge device of a first network to provide a first part of a first service to a user equipment, establishing a first session between the first edge device and a device of a second network for a duration of the first service, wherein the first session is associated with a first portion of a first address, establishing a second session between the first edge device and the user equipment in accordance with a first access technology to facilitate a transfer of first data associated with the first part of the first service to the user equipment, wherein the second session is associated with a second portion of the first address, and wherein the second portion of the first address identifies the first access technology, and transferring the first data to the user equipment in accordance with the first address, wherein the first address comprises a third portion that identifies the user equipment. Computing device 600 can facilitate in whole or in part identifying an application executed by a communication device in accordance with a service, identifying a first edge device of an access network capable of providing a first portion of the service in accordance with a first access technology and a second edge device of the access network capable of providing the first portion of the service in accordance with a second access technology that is different from the first access technology, selecting one of the first edge device or the second edge device as a first selected edge device, wherein the selecting of the first selected edge device is based on the identifying of the application, and transferring first data associated with the first portion of the service from the first selected edge device to the communication device in accordance with a first address, wherein the first address comprises a first address portion that identifies a first main session between a core network and an access network, a second address portion that identifies the communication device, and a third address portion that identifies a first selected access technology of the first selected edge device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for conducting various embodiments thereof. Moreover, the classifier can be employed to determine a ranking or priority of each cell site of the acquired network. A classifier is a function that maps an input attribute vector, $x=(x_1, x_2, x_3, x_4, \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
        establishing a main session between a core network and an access network responsive to verifying a credential in a request for a service from a user equipment by comparison of the credential with a plurality of credentials;
        selecting a first edge device of the access network responsive to the establishing of the main session;
        establishing a first virtual session between the first edge device and the user equipment in accordance with at least a first access technology, and a second virtual session in accordance with a second access technology that is different from the first access technology; and
        conveying first data associated with at least a part of the service to the user equipment in accordance with an address, wherein the address comprises a first identifier that identifies the main session, a second identifier that identifies the user equipment, a third identifier that identifies the first virtual session and a fourth identifier that identifies the second virtual session.

2. The device of claim 1, wherein the service comprises a streaming video service, a voice service, a text message service, a videoconference service, or any combination thereof.

3. The device of claim 1, wherein the operations further comprise:
    identifying at least a first parameter responsive to the verifying, wherein the first parameter is associated with a service license agreement, and
    wherein the selecting of the first edge device is further responsive to the identifying of the first parameter.

4. The device of claim 3, wherein at least the first parameter identifies a quality of service (QoS) parameter, a quality of experience (QoE) parameter, or a combination thereof.

5. The device of claim 1, wherein the operations further comprise:
    identifying at least a first parameter responsive to the verifying, wherein the first parameter is associated with the user equipment, and
    wherein the selecting of the first edge device is further responsive to the identifying of the first parameter.

6. The device of claim 5, wherein the first parameter identifies a display capability of the user equipment, an audio capability of the user equipment, a processing speed associated with the user equipment, a memory or buffer capacity associated with the user equipment, a location of the user equipment, a power or battery level associated with the user equipment, or any combination thereof.

7. The device of claim 1, wherein the operations further comprise:
    identifying at least a first parameter responsive to the verifying, wherein the first parameter is associated with the first edge device, and
    wherein the selecting of the first edge device is further responsive to the identifying of the first parameter.

8. The device of claim 7, wherein the first parameter identifies a load experienced by the first edge device, a range of coverage supported by the first edge device, throughput available at the first edge device, bandwidth available at the first edge device, frequency bands available at the first edge device, or any combination thereof.

9. The device of claim 1, further comprising establishing a plurality of virtual sessions.

10. The device of claim 1, wherein the first identifier comprises an Internet Protocol (IP) address.

11. The device of claim 10, wherein the IP address is maintained for a duration of a provisioning of the service to the user equipment.

12. The device of claim 1, wherein the second identifier comprises a serial number of the user equipment, a MAC address of the user equipment, or a combination thereof.

13. A non-transitory, machine-readable medium, comprising executable instructions that, when executed by a processing system including a processor, facilitate performance of operations, the operations comprising:
- establishing a first session between a first edge device of a first network and a device of a second network for a duration of a first service provided in a first part to a user equipment, wherein the first session is associated with a first portion of a first address;
- establishing a second session between the first edge device and the user equipment in accordance with a first access technology to facilitate a transfer of first data associated with the first part of the first service to the user equipment, wherein the second session is associated with a second portion of the first address, and wherein the second portion of the first address identifies the first access technology;
- transferring the first data to the user equipment in accordance with the first address, wherein the first address comprises a third portion that identifies the user equipment; and
- receiving second data from the user equipment in accordance with a second address that is associated with a second service, wherein the second address comprises a fourth portion that identifies a third session between the first edge device and the device of the second network, wherein the second address comprises the third portion that identifies the user equipment, wherein the second address comprises a fifth portion that identifies a second access technology that facilitates a transfer of the second data from the user equipment, and wherein the second access technology is different from the first access technology.

14. The non-transitory, machine-readable medium of claim 13, wherein the operations further comprise selecting the first edge device in accordance with at least one parameter associated with: the first edge device, the user equipment, or a combination thereof, and wherein the at least one parameter comprises at least one of a received signal strength indicator (RSSI), an interference level, a noise level, a load, a power level, or any combination thereof.

15. The non-transitory, machine-readable medium of claim 14, wherein the first portion of the first address comprises an Internet Protocol (IP) address.

16. The non-transitory, machine-readable medium of claim 14, wherein the first portion of the first address comprises an Internet Protocol (IP) address.

17. The non-transitory, machine-readable medium of claim 16, wherein the IP address is maintained for a period of provisioning the first service to the user equipment.

18. A method comprising:
- selecting, by a processing system including a processor, one of a first edge device or a second edge device as a first selected edge device, wherein the selecting of the first selected edge device is based on an identity of an application executed by a communication device in accordance with a service, and wherein the first edge device is capable of providing a first portion of the service in accordance with a first access technology and the second edge device is capable of providing the first portion of the service in accordance with a second access technology that is different from the first access technology;
- transferring first data associated with the first portion of the service from the first selected edge device to the communication device in accordance with a first address, wherein the first address comprises a first address portion that identifies a first main session between a core network and the access network, a second address portion that identifies the communication device, and a third address portion that identifies a first selected access technology of the first selected edge device; and
- transferring second data associated with a second portion of the service from the first selected edge device to the communication device in accordance with a second address, wherein the second address comprises the first address portion, the second address portion, and a fourth address portion that is different from the third address portion, and wherein the fourth address portion corresponds to a second selected access technology that is different from the first selected access technology.

19. The method of claim 18, wherein the first portion of the first address comprises an Internet Protocol (IP) address.

20. The method of claim 19, wherein the IP address is maintained for a period of provisioning the service to the communication device.

* * * * *